(12) United States Patent
Fikouras et al.

(10) Patent No.: US 9,983,556 B2
(45) Date of Patent: May 29, 2018

(54) FUNCTION HANDLING IN A BUILDING

(75) Inventors: Ioannis Fikouras, Stockholm (SE); Vincent Huang, Sollentuna (SE); Joerg Niemoeller, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 555 days.

(21) Appl. No.: 14/423,258

(22) PCT Filed: Aug. 23, 2012

(86) PCT No.: PCT/EP2012/066422
§ 371 (c)(1),
(2), (4) Date: Feb. 23, 2015

(87) PCT Pub. No.: WO2014/029438
PCT Pub. Date: Feb. 27, 2014

(65) Prior Publication Data
US 2015/0241858 A1    Aug. 27, 2015

(51) Int. Cl.
*G05B 15/02* (2006.01)
*D21H 27/20* (2006.01)
*H04B 5/00* (2006.01)
*H05B 33/08* (2006.01)
*H05B 37/02* (2006.01)

(52) U.S. Cl.
CPC .......... *G05B 15/02* (2013.01); *D21H 27/20* (2013.01); *H04B 5/0012* (2013.01); *H05B 33/0863* (2013.01); *H05B 37/0272* (2013.01)

(58) Field of Classification Search
None
See application file for complete search history.

(56) References Cited

U.S. PATENT DOCUMENTS

| | | | | |
|---|---|---|---|---|
| 4,635,410 A | * | 1/1987 | Chumbley | B44C 7/022 160/378 |
| 4,728,300 A | * | 3/1988 | Shillito | E04F 13/08 439/426 |
| 6,128,873 A | * | 10/2000 | Shipman | A47B 57/425 52/220.7 |

(Continued)

FOREIGN PATENT DOCUMENTS

DE          4011198 A1    10/1991
WO          9726751 A1     7/1997

*Primary Examiner* — K. Wong
(74) *Attorney, Agent, or Firm* — Patent Portfolio Builders, PLLC

(57) ABSTRACT

The invention is directed towards a function activity handling arrangement for provision in a building as well as a method, computer program and computer program product for performing an activity of a function in a building. The arrangement comprises a wallpaper (10, 3, 14) with a group of embedded electrical wires. The arrangement may also comprise a user input detector (18) equipped with a wire connector for connection to the wire group, a pulse providing unit sending electric pulses to the wire group, a pulse response detecting unit detecting a group of response signals corresponding to the sent pulses and a pulse response analyzing unit that compares the response signal group with a set of response patterns and provides, if the detected response signal group matches a response pattern, user input data for a corresponding function.

15 Claims, 6 Drawing Sheets

(56) References Cited

U.S. PATENT DOCUMENTS

| | | | | |
|---|---|---|---|---|
| 7,636,365 B2 * | 12/2009 | Chang | ................... | H04L 67/12 |
| | | | | 370/401 |
| 2005/0125083 A1 | 6/2005 | Kiko | | |
| 2009/0219712 A1 * | 9/2009 | Verjans | ................ | D21H 27/20 |
| | | | | 362/147 |
| 2011/0138702 A1 * | 6/2011 | Kelley | ................ | E04B 2/8647 |
| | | | | 52/79.9 |

* cited by examiner

W1 W2 W3

FUNCTION HANDLING IN A BUILDING

TECHNICAL FIELD

The invention relates to the handling of functions in a building. More particularly, the invention relates to a function activity handling arrangement for provision in a building as well as a method, computer program and computer program product for performing an activity of a function in a building.

BACKGROUND

In buildings it is common to provide various functions. A function may for instance be a stationary function such as illumination in a room, air conditioning and heating. However a function may also be a temporary function such as the showing of a slide show using video projection equipment, the playing of sound using an audio system etc.

A fixed system, such as an illumination system is often provided with a fixed actuator being mounted on a conductor in the room, while the actuator of a temporarily implemented function may be provided through a dedicated device, such as a beamer. The actuator can then be manipulated by a user for performing an activity of the function.

The location where the user manipulation is performed is thus typically inflexible and made at the same position or using the same entity in the building. In the case of a fixed actuator, the selection of this spot is typically made in a planning stage before implementation.

It may be of interest to provide a greater flexibility in the placing of a spot from where the manipulation is being performed. There may for instance be inconveniences with the location selected during planning, which inconveniences may not emerge before the functionality has been implemented. However, then it may be difficult to make any changes. A user may also want to have a changed placing, for instance because of a different placing of furniture in a room. A spot used at one point in time may thus be inconvenient if a new design of the interior is provided.

In the case of a temporary solution it is for instance possible that a user performing a presentation of a slide show would like to select slides from a certain position of the room and at the same time not be restricted by the use of a dedicated user interface on a device controlling the presentation.

In short there is a need for a greater flexibility in the location from where an activity of a function is controlled.

There can in this regard also be mentioned that there also exists an aesthetical aspect. Light switches and other actuating equipment in a room may for instance be considered to be unattractive and may also for this reason be desirable to be omitted.

One further problem is that often the selections that are possible to make in relation to a function, such as a light switch function, is binary type of selection, such as an on/off selection. It is in this respect often of interest to provide a wider range of possible selections in relation to the function.

There are thus a number of problems associated with the location from where a function is controlled. The present invention is directed towards one or more of the above-mentioned problems.

SUMMARY

One object of the invention is to enable a greater flexibility in the provision of a physical location at which a user can control an activity of a function.

This object is according to a first aspect achieved by a function activity handling arrangement for provision in a building, where the arrangement comprises a wallpaper with a group of embedded electrical wires comprising at least one wire.

In a variation of this first aspect the function activity handling arrangement also comprises a user input detector. The user input detector in turn comprises a wire connector for connection to the wire group, a pulse providing unit that sends electric pulses to the wire group, a pulse response detecting unit that detects a group of response signals corresponding to the sent pulses and a pulse response analysing unit. The pulse response analysing unit compares the response signal group with a set of response patterns and provides, if the detected response signal group matches a response pattern, user input data for a corresponding function.

This object is according to a second aspect achieved through a method for performing an activity of a function in a building. The method is performed in a user input detector and comprises:

sending electric pulses to electrical wires of a wire group, which wire group comprises at least one wire embedded in a wallpaper, detecting a group of response signals corresponding to the sent pulses, comparing the detected response signal group with a set of response patterns, and if the detected response signal group matches a response pattern providing user input data for a function corresponding to the response pattern in order to perform the activity The object is according to a third aspect also achieved through a computer program for performing an activity of a function in a building. The computer program comprises computer program code which when run in a user input detector, causes the user input detector to:

send electric pulses to electrical wires of a wire group comprising at least one wire embedded in a wallpaper, detect a group of response signals corresponding to the sent pulses, compare the detected response signal group with a set of response patterns, and provide, if the response signal group matches a response pattern, user input data for a function corresponding to the response pattern in order to perform the activity.

The object is according to a fourth aspect further achieved through a computer program product for performing an activity of a function in a building. The computer program product is provided on a data carrier and comprises the computer program code of the third aspect.

The invention according to the above-mentioned aspects has a number of advantages. The invention allows the provision of user inputs, such as a hand, touching a location of the wallpaper to control an activity of a function. Since the location can be chosen from all such wallpaper provided in a room of the building, there is great liberty in where the location may be provided.

In an advantageous variation of the first aspect, the user input detector comprises a function associating unit. The function associating unit obtains, in a training interval, at least one response signal group, forms a response pattern based on the received response signal group and associates a function with the response pattern.

In a corresponding variation of the second aspect, the method further comprises assigning a function to a response pattern through obtaining, in a training interval, at least one response signal group, forming a response patter based on the response signal group and associating a function with the response pattern.

These variations provide the further advantage of providing a flexible association of a location with a function in both time and space, which further enhances the flexibility with which locations can be selected and used.

According to a further variation of the first aspect, the function associating unit receives several response signal groups and forms a response pattern comprising the several received response signal groups.

According to a corresponding variation of the second aspect, several response signal groups are received and the formed response pattern comprises the several received response signal groups.

According to yet another variation of the first aspect, the function associating unit furthermore updates, after the pulse response analysing unit has found a match between a detected response signal group and a response pattern, the response pattern with this response signal group.

According to a corresponding variation of the second aspect, the method further comprises after finding a match between a detected response signal group and a response pattern, updating the response pattern with this response signal group.

According to a further variation of the first aspect, the function activity handling arrangement also comprises a communication interface for communicating with a remote user interface via which a user may operate the function associating unit in order to associate a response pattern with the function.

According to a corresponding variation of the second aspect, the method further comprises communicating with a remote user interface for allowing a user to associate said response pattern with said function.

The wires in the wire group may extend longitudinally between opposing edges (of the wallpaper. They may also be provided in a pattern with each wire being separated from every other wire It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards using of functions in a building such as stationary functions like illumination in a room, air conditioning and heating. However a function may also be a temporary function such as the showing of a slide show using video projection equipment, the playing of sound using an audio system etc.

The invention is more particularity directed towards providing a greater flexibility in the selection of a physical location from where a user can control an activity of such a function.

Figure 1:
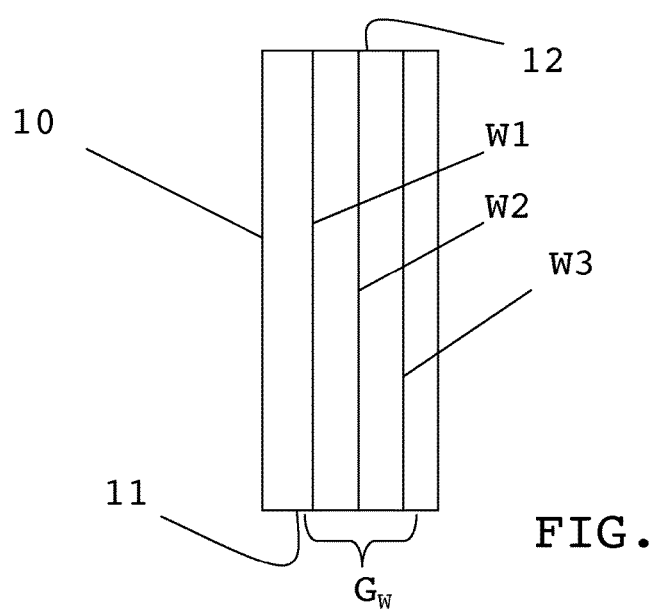
FIG. 1 schematically shows a wallpaper with embedded electrical wires.

In order to enable this there is provided a special wallpaper. FIG. 1 schematically shows a length 10 of such a special wallpaper. The wallpaper 10 comprises electrical wires W1, W2 and W3. There are thus electrical wires embedded in the wallpaper. There is thus a group $G_W$ of wires comprising at least one wire in the wallpaper. The wires may extend longitudinally in the wallpaper. The wallpaper 10 may be provided as a roll of wallpaper and in this case the wires may extend circumferentially in the roll. When being papered on a wall the wires of a length of wallpaper, such as the length 10, may extend longitudinally between opposing edges of the wallpaper, for instance between a first edge 11 provided at the floor and a second edge 12 provided at the ceiling of a room.

The wires may furthermore be provided in a pattern. In the example in FIG. 1, the wires are provided as equidistant straight lines. The pattern shown in FIG. 1 is one example of a symmetrical pattern. The wallpaper is furthermore not limited to this specific pattern. It is for instance possible with some kind of wave shaped or a meandering pattern. The pattern may also be unstructured or unsymmetrical. It is therefore also evident that the distances between the wires of the pattern in FIG. 1 may differ from each other. However, it is advantageous if the wires stretch between two edges and are separated from each other. Each wire is thus separated from every other wire.

Figure 2:
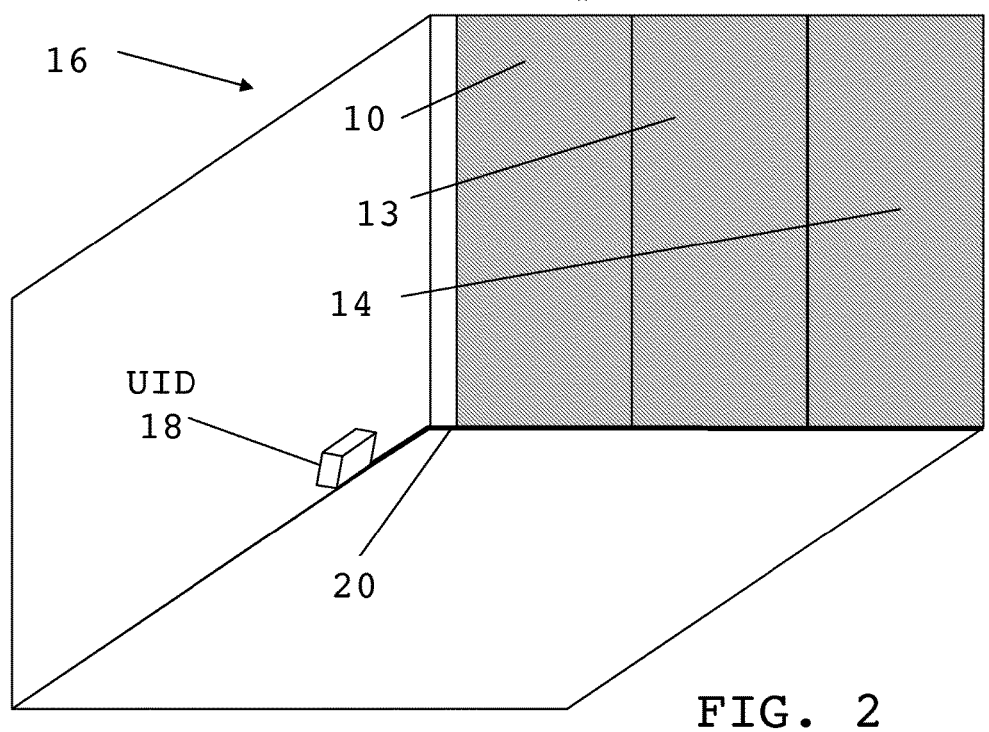
FIG. 2 schematically shows a room in a building comprising a user input detector, where one wall of the room has been provided with the wallpaper of FIG. 1.

FIG. 2 schematically shows three lengths 10, 13 and 14 of a special wallpaper being papered on a wall of a room 16.

It should be realized that also the other walls may be provided with a special wallpaper. However this has been omitted in order to better describe the invention. It should also be realized that it is possible that wallpaper with wires is only provided on parts of a wall. The whole wall need thus not be provided with special wallpaper. It is for instance possible that only an area of a wall where inputs in relation to a function are to be provided is papered with the special wallpaper.

In the room there is also a user input detector UID 18, which is connected with an electrical connection 20 to some or all of the wires of the wallpaper, for instance at the first edge of the lengths 10, 13 and 14. The connection may here be a parallel connection to the different electrical wires.

Figure 3:
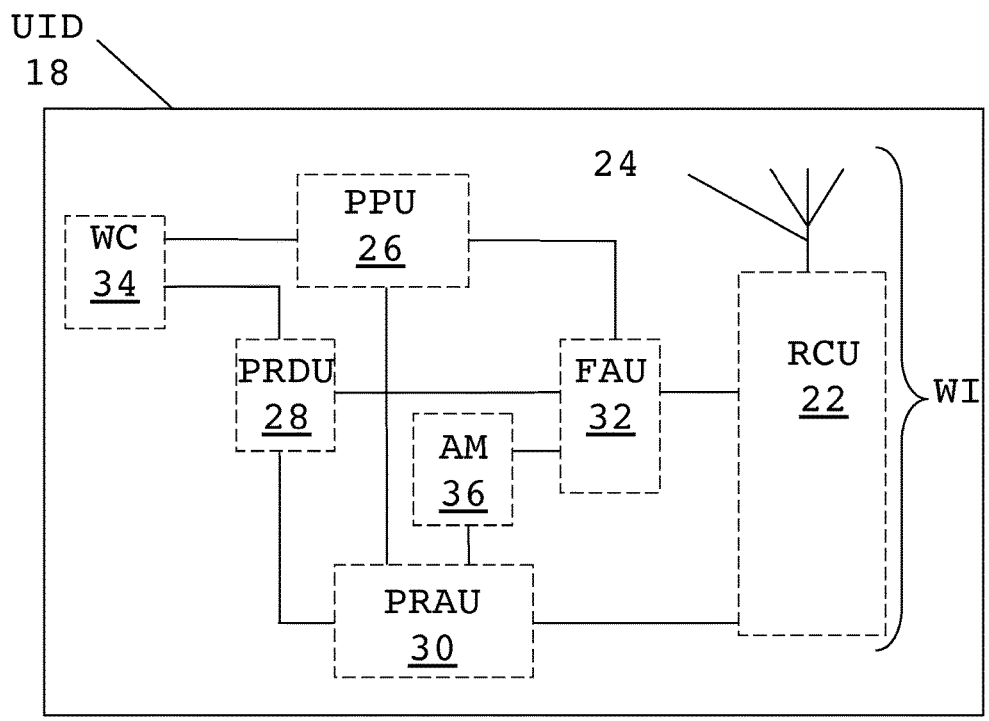
FIG. 3 shows a block schematic of the user input detector.

FIG. 3 shows an exemplifying block schematic of the user input detector 18. It comprises a wire connector WC 34 for connection to the electrical wires of the wallpaper. It also comprises a pulse providing unit PPU 26 being connected to the wire connector 34 in order to provide electric pulses to the electrical wires. There is also a pulse response detecting unit PRDU 28 connected to the wire connector 34 for detecting responses to the above-mentioned pulses. The pulse providing unit 26 is furthermore connected to a function association unit FAU 32 and to a pulse response analysing unit 30, which analyses pulse responses. The pulse response detecting unit 28 is also connected to the function associating unit 32 and the pulse response analysing unit 30. There is furthermore an association memory AM 36 connected to function associating unit 32 and the pulse response analysing unit 30. The function associating unit 32 and pulse response analysing unit 30 are both connected to a radio communication unit RCU 22, which in turn is connected to an antenna 24. The radio communication unit 22 and antenna 24 here also make up a communication interface that is furthermore a wireless interface WI. The wireless interface WI may employ any of a number of different communication techniques, such as Bluetooth, Wi-Fi, i.e. IEEE 802.11, as well as any of a number of cellular communication techniques.

Figure 4:
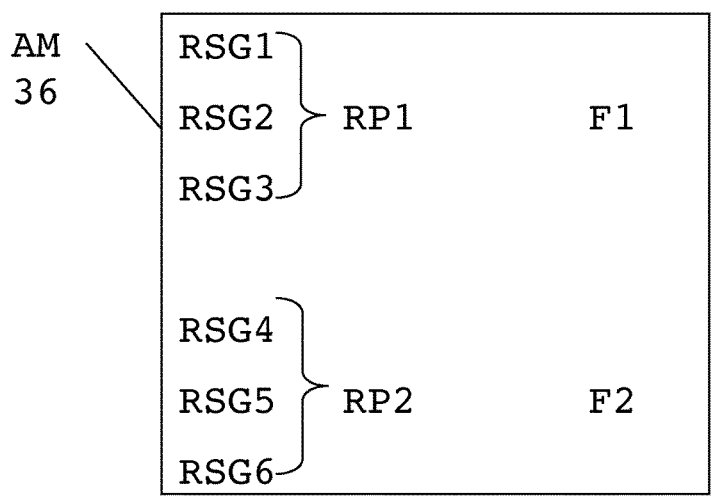
FIG. 4 shows the content of an association memory of the user input detector, FIG. 5 schematically shows the user input detector communicating with a first and a second function handling unit, FIG. 6 schematically shows an electric circuit representation of electrical wires of the wallpaper.

FIG. 4 schematically shows exemplifying content of the association memory 36. The association memory 36 comprises a number of response signal groups. It comprises a first response signal group RSG1, a second response signal group RSG2 and a third response signal group RSG3. These three response signal groups here make up a first response pattern RP1 being associated with a first function F1. In the association memory 36 there is also a fourth response signal group RSG4, a fifth response signal group RSG5 and a sixth response signal group RSG6. These three response signal groups here make up a second response pattern RP2 being associated with a second function F2. It can in this way be seen that the association memory comprises a set of response patterns. In the example of FIG. 4, there are two response patterns in the set, the first and the second response pattern RP1 and RP2. As will be seen later there may be fewer, such as one. However, there may also be more response patterns. The concept of response signal group and response pattern will be discussed in more detail later.

Figure 5:
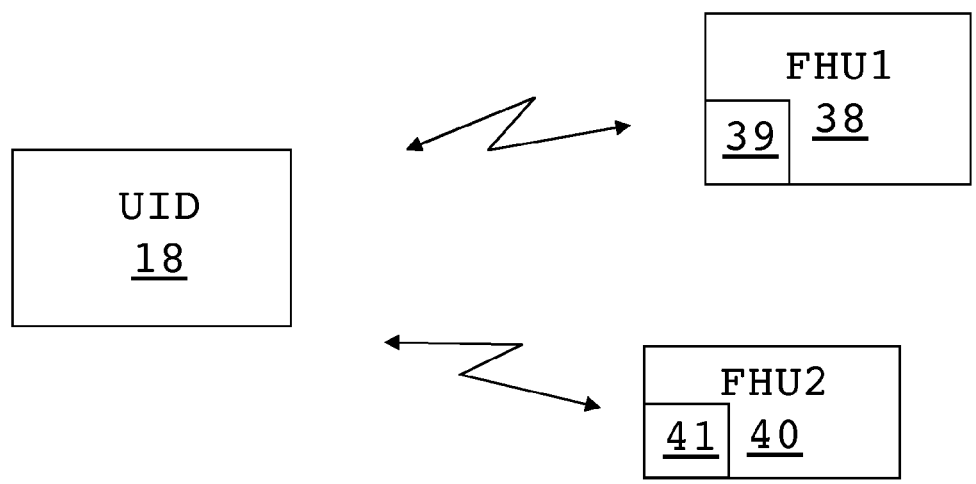

FIG. 5 schematically shows the user input detector 18 communicating wirelessly with a first function handling unit FHU1 38 and with a second function handling unit FHU2 40. The first function handling unit 38 also comprises a first user interface 39, for instance in the form of a touch screen. Also the second function handling unit 40 comprises a user interface 41, for instance in the form of a display and keyboard or keypad. These user interfaces are remote user interfaces used in relation to the user input detector.

In one variation of the invention, the special wallpaper 10, 13 and 14 forms a function activity handling arrangement, which is an arrangement for handling user inputs made in relation to an activity of a function. In another variation of the invention the wallpaper 10, 13 and 14 and user input detector 18 together form a function activity handling arrangement. The functionality of these two variations will now be described.

Figure 6:
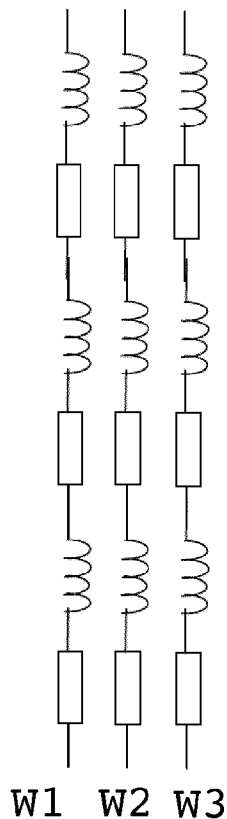

The wires W1, W2 and W3 of the wallpaper 10, 13 and 14 have resistive and inductive properties. They may therefore each be considered to form a series connection of resistors and inductors, which is schematically shown in FIG. 6. These wires can thus be modelled as a series of resistors and inductors. If an electric pulse is injected in such a wire a distinct pulse response will be received.

Figure 7:
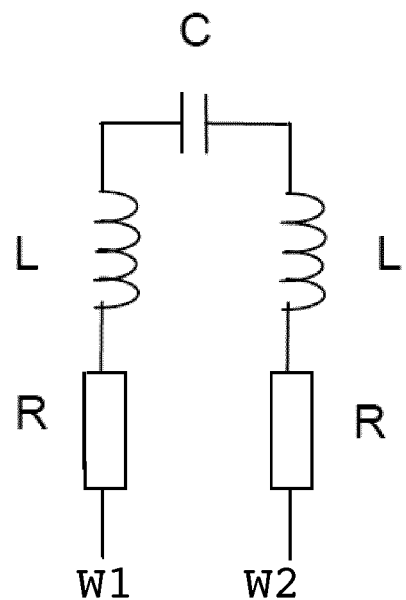
FIG. 7 shows a resulting electric circuit of two of the electrical wires caused by an object touching the wallpaper, FIG. 8 schematically shows a pulse being sent to the electrical wires of the wallpaper together with a received pulse response.

If an object, such as a hand, touches the wallpaper 10, 13 and 14, then the electrical properties of the wires will be changed in the area where the touch is made. If the touch is made in an area through which a number of wires are running, such as the first and second wires W1 and W2, then there will be a capacitive connection C between the wires. There is thus formed a series connection between the two wires W1 and W2, which series connection is made up of a resistance R and inductance L of the first wire W1, the capacitance C and a resistance R and inductance L of the second wire W2, as shown in FIG. 7. When the wall is touched by a hand of human, the hand may thus introduce a capacitance C forming a circuit such as the circuit in FIG. 7. It should here be realized that the values of the inductances L, resistances R and capacitance C will vary depending on where in the longitudinal direction of the length of the wallpaper 10, 13 and 14 the hand touches the wall. In case wires are provided in a pattern, such as a meandering pattern, then it is possible that a capacitance is introduced between different parts of the same wire.

Figure 8:
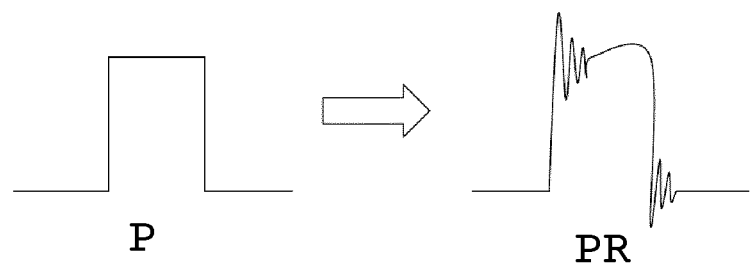

If a pulse, such as a square pulse P as shown in FIG. 8 is sent to a wire in an area of the wall being touched, then this wire will provide a pulse response PR having a shape that differs from the shape of the responses of wires in an area that is not touched. One contribution to this difference is the introduction of the capacitance C. However, depending on where the hand is placed, along the length of the wires, it also changes the values of the inductances and resistances of the wire. Therefore, the values of R and L can also be changed in addition to the introduction of the capacitance C. With different values of L and R and an introduction of C, the shape of the response thus changes.

In case the wall comprises n wires and the response from an $i^{th}$ wire at time t is denoted $PR_i(t)$, the total response from all wires can then be expressed as:

$$PR = \begin{bmatrix} PR_1(t) \\ PR_2(t) \\ \vdots \\ PR_n(t) \end{bmatrix}$$

This vector PR is then used for comparison purposes to find out if a user input for a function has been made or not. One such vector is furthermore a group of response signals or a response signal group corresponding to a group of sent pulses.

Put differently, the circuit of FIG. 6 has a typical characteristic response to a pulse. If a group of electric pulses P of pre-defined shape are being sent, one to each wire, then there will be received a group PR of responses, where there is one response from each wire. There will thus be received a group, vector or array of responses. This group, vector or array may then be employed to form a pattern, which pattern provides an indication of if the wall has been touched or not and if it has been touched, where it has been touched. If there is no touch there is a normal response at each wire and hence a "normal" pattern, where a "normal" pattern is the pattern that occurs in the case of an untouched wallpaper. However, when there is a touch, the pattern will differ from the "normal" pattern because the electrical circuits in the area of the touch are changed. The pulse responses of the wires in this area will differ from the normal responses and this is used in relation to a function. A pattern may furthermore be made up of more than one such vector, group or array.

The pulses were above exemplified through the use of square pulses. It should be understood that the pulses need not be square pulses. It is for instance also possible with saw tooth or triangular pulses as well as pulses shaped as half-circles or half-ellipses.

Figure 9:
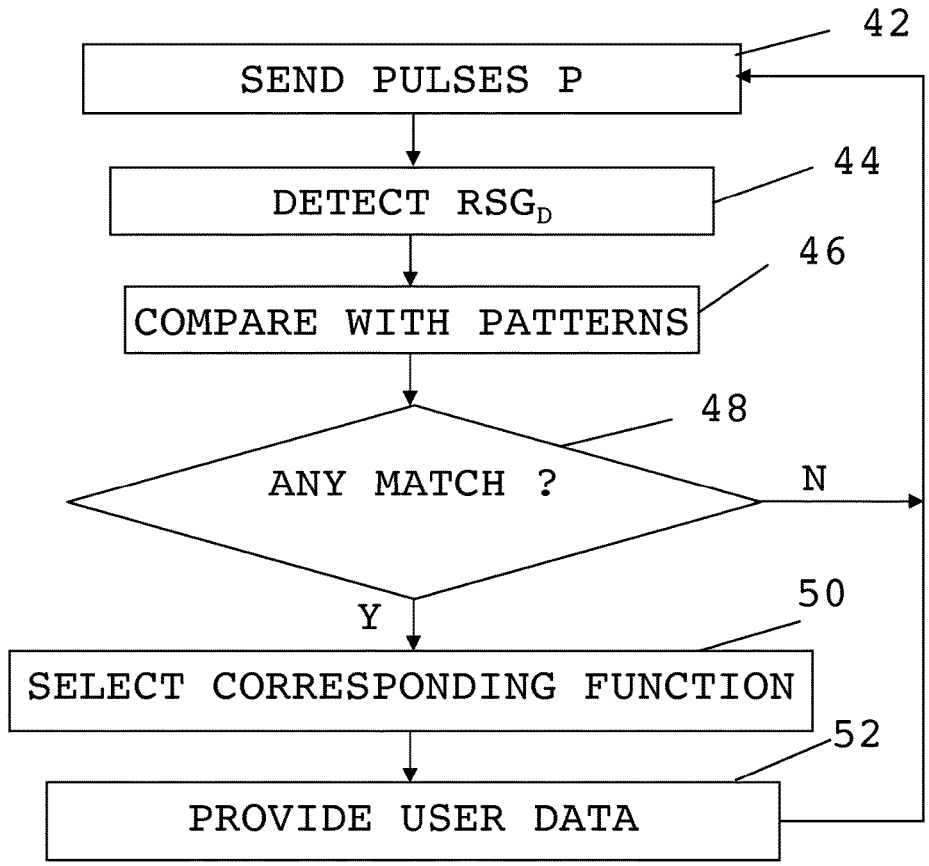
FIG. 9 shows a flow chart of a general method for performing an activity of a function according to a first embodiment of the invention and being carried out in the user input detector, FIG. 10 schematically shows a number of method steps in a first part of a method for performing an activity of a function according to a second embodiment of the invention also being carried out in the user input detector, FIG. 11 schematically shows a number of method steps in a second part of the method for performing an activity of a function according to the second embodiment of the invention also being carried out in the user input detector, and FIG. 12 schematically shows a computer program product in the form of a CD ROM disc with a computer program performing the functionality of various units of the user input detector.

A first embodiment will now be described with reference being made to FIG. 9, which shows a flow chart of a number of method steps in a method for performing an activity of a function in a building according to the first embodiment. In this first embodiment the association memory 36 has only one pattern formed by one response signal group, which pattern has been associated with a function beforehand. The pattern corresponds to the placing of an object such as a hand on a part of the wall with the wallpaper 10, 13 and 14 in the room 16. The response signal group stored in the association memory 36 is thus associated with an object, such as a hand, touching the wall at a certain location. In this example the pattern is the first response pattern RP1, the response signal group is the first response signal group RSG1 and the function is the first function F1, which is performed by the first function handling unit 38. As an example this function is an illumination function of the room and the first function handling unit 38 is a computer controlling the illumination of the whole room.

The method may therefore start with the pulse providing unit 26 sending pulses P to the wire group $G_W$ with electrical wires W1, W2 and W3 of the wallpaper 10, 13, 14, step 42. Thereafter the pulse response detecting unit 28 detects the responses. It thus detects a response signal group $RSG_D$ corresponding to the sent pulses, step 44. It may thus receive the pulse responses PR from all the wires W1, W2 and W3 connected to the user input detector 18 obtained when the object is at said position. The newly received response signal group $RSG_D$ is then sent to the pulse response analysing unit 30. The pulse response signal analysing unit 30 thereafter fetches the set of patterns, i.e. the stored response signal groups, from the association memory 36 and compares the detected group $RSG_D$ with the patterns in the association memory 36, step 46. In this example there is only one pattern RP1 formed by the first response signal group RSG1.

The pulse response analysing unit 30 thus compares the detected response signal group $RSG_D$ with the patterns P1 in the association memory 36 and if there is no match, i.e. if no detected response signal group matches any patterns in the association memory, step 48, then the pulse providing unit 26 continues sending pulses step 42, while if there is a match, step 48, then the corresponding function may be selected by the pulse response analysing unit 30, step 50. Thereafter the pulse response analysing unit 30 provides user input data for the function, step 52. In this example there is only one function, the first function F1. Therefore when there is a match the pulse response analysing unit 30 provides such data to the function through connecting to the wireless interface WI and sending information to the first function handling unit 38 that a user of the first function F1 has made a user input. The first function handling unit 38 may then perform an activity of the function corresponding to the user input, where the activity may be the activation of the function. The pulse providing unit 26 continues sending pulses, step 42. The pulse providing unit 26 thus repeatedly sends pulses that are detected and processed in the above-described manner.

It can in this way be seen that an object, such as a hand, touching a certain pre-defined location of the wallpaper 10, 13 and 14 will control an activity of a function such as the turning on or off the lights in the room 16. Since the location can be chosen from all of the special wallpaper 10, 13 and 14 in the room 16, it can also be seen that there is great liberty in where the location may be provided. It is for instance not limited to be placed at any cables.

Figure 10:
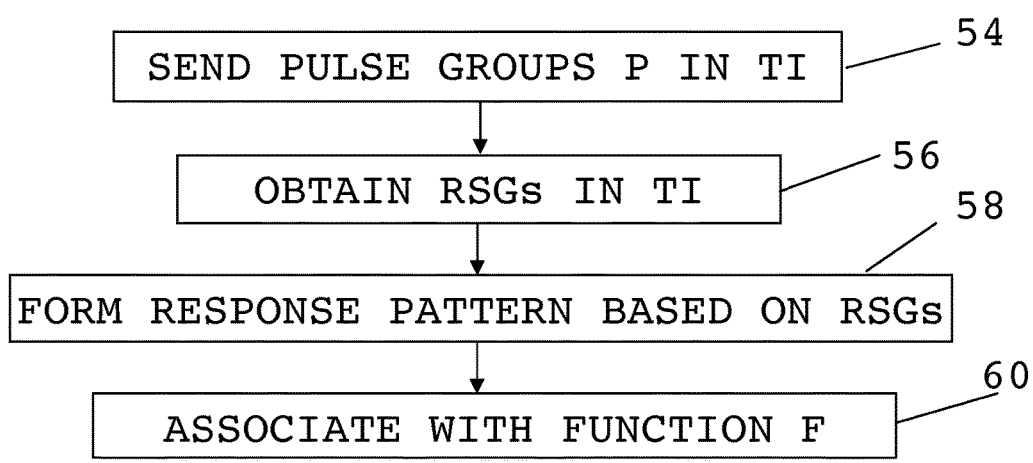
Figure 11:
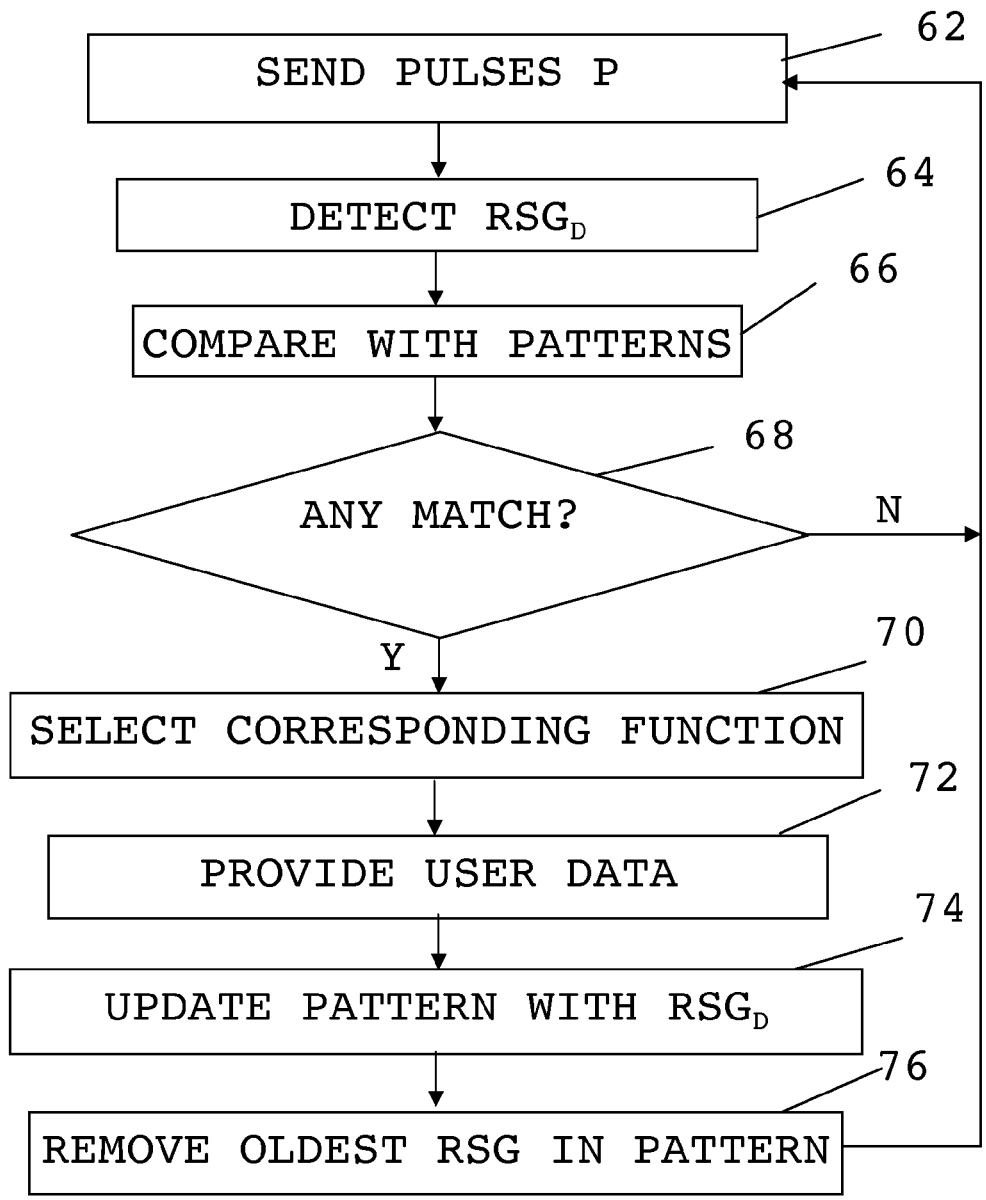

A second embodiment will now be described with reference being made to FIGS. 10 and 11, where FIG. 10 schematically shows a number of method steps being performed in a first part of a method for performing an activity of a function and FIG. 11 schematically shows a number of method steps in a second part of the method.

In the first embodiment a spot was pre-assigned to a function. In this second embodiment a user is allowed to assign a function to a spot on a wall with special wallpaper.

It is thus possible to assign a function to a pattern formed by one or more response signal groups. This may be done through a user employing a user interface, such as the user interface 39 of the first function handling unit 38. A user may, via this user interface 39, select to assign the first function F1 to a spot on the wall. This assigning may be controlled by the function associating unit 32, which may communicate, via the wireless interface WI, information to be presented to the user via the user interface 39. The user may here be presented with a menu in which he or she may select to associate a function to the wall. If the user selects to associate a function, he or she may then be informed that there is provided a training interval TI, i.e. a time interval in which the user may provide input to the function activity handling arrangement. This input is then used to associate a function to a location or spot on the wall. It can thus be seen that in this way the user is able to operate the function associating unit 32 via the user interface 39 and wireless interface WI.

Touch sensitivity in the wallpaper may therefore be utilized to flexibly assign locations on the wall to functions. If for example a new light switch shall be created, the user may be instructed to mark an area on the wallpaper that shall act as switch by a pen. For example a circle or square or cross may mark the spot on the wall. The function activity handling arrangement may then be put into a learning mode to learn the location that is to activate the new function, e.g. the new light switch. The learning mode is then typically provided during the training interval. In the learning mode the marked spot on the wall may then be pressed repeatedly. When leaving the learning mode the function activity handling arrangement has correlated the new spot or location on the wall with the new function. In this way new control elements, i.e. locations where user inputs may be made, can be flexibly created.

Therefore in this training interval TI corresponding to the learning mode, the function associating unit 32 instructs the pulse providing unit 26 to provide pulses P to the wires W1, W2 and W3. Based on this instruction the pulse providing unit 26 sends groups of pulses P, step 54. These groups may be sent regularly throughout the training interval TI. The responses to these pulses are then detected by the pulse response detecting unit 28. The user in this interval thus repeatedly puts an object, such as his or her hand, on the wall at the same position or essentially the same position, and the responses corresponding to the touches of the object are used to form a response pattern. In order to obtain the pattern, different response signal groups obtained at various instances in time during the training interval may be collected. These are then forwarded to the function associating unit 32, and in this way the function associating unit 32 obtains the response signal groups of the training interval TI comprising at least one response signal group, step 56.

The function associating unit 32 may be able to separate normal pulse responses, i.e. pulse responses when there are no touches on the wallpaper, from pulse responses where there are touches. The function associating unit 32 may thus be able to separate a pulse signal group involving no touch from a pulse signal group in which a touch as been made and in which at least one pulse response PR of a wire has been changed in relation to a normal pulse response. The function associating unit 32 then forms a response pattern based on the received response signal groups associated with touches, step 58. The pattern may comprise these response signal groups and be stored in the association memory 36. In the example in FIG. 4 there are three such response signal groups RSG1, RSG2 and RSG3 obtained at different instances in time in the training interval TI that make up a first response pattern RP1. Thereafter the function associating unit 32 associates the response pattern to a function, step 60. This association may be made automatically or the user may choose between a number of functions via the interface 39. In the present example the association is made to the first function F1.

It is in this way possible that the detector is trained to detect a touch of the hand at a certain location or spot on the wall and then perform an associated function. It is here also possible that more data is liked to a location, such as an intention of the user, like start stop, on, off, up, down, backward, forward, fast forward and fast backward. Thereby a flexible association of a location with a function and even various commands of a function is allowed both in time and space, which further enhances the flexibility with which locations can be selected and used. A sequence of inputs can thus be made to a function from one or more locations.

It is in the same manner possible to assign a second function F2 to another spot on the wall and in this case it is possible that the user is instructed via the user interface 41 of the second function handling unit 40. It can thus be seen that it is in the same way possible to obtain another response pattern RP2 of response signal groups RSG4, RSG5 and RSG6 that is associated with the second function F2.

The association between the location and the object may furthermore employ machine learning, for letting the function associating unit 32 recognize the changes in the response signal groups from the normal and associate these changes to the function.

By detecting a response signal group, it is possible to define a corresponding activity of a function, which as was mentioned earlier can be done by using machine learning techniques.

As one or more functions in this way have been associated with various locations of the special wallpaper, it is then possible for the user to perform activities in the associated functions. As the user has in this way trained the detector it is now possible to perform an activity in a function through touching the wallpaper at the associated position.

In order to be able to detect such a user input, the pulse providing unit 26 sends a group of pulses P to the group $G_W$ of electrical wires W1, W2 and W3 of the wallpaper 10, 13 and 14, step 62. Thereafter the pulse response detecting unit 28 detects responses. It thus detects a response signal group $RSG_D$ corresponding to the group of sent pulses, step 64. This response signal group $RSG_D$ is then sent to the pulse response analysing unit 30, which in turn fetches the response patterns RP1 and RP2 from the association memory 30. The pulse response analysing unit 30 then compares these response patterns RP1 and RP2 with the received response signal group, step 66. In this example there are thus three response signal groups RSG1, RSG2 and RSG3 in a first response pattern RP1 associated with the first function F1 and three response signal groups RSG4, RSG5 and RSG6 in a second response pattern RP2 associated with the second function F2 being compared with the detected response signal group $RSG_D$.

The pulse response analysing unit 30 thus compares the detected response signal group with these patterns. If there is no match, i.e. if no detected response signal group $RSG_D$ is considered to correspond to any of patterns, step 68, then the pulse providing unit 26 continues to send pulses, step 62, while if a match is found, step 68, i.e. there is considered to be a correspondence between the detected response signal group $RSG_D$ and a response pattern, then the corresponding function is selected by the pulse response analysing unit 30, step 70. Thereafter the pulse response analysing unit 30 provides user input data for the function, step 72. It may thus inform a function handling device handling a function about there being a user input and perhaps also type of user input, such as a type of instruction to the function like start, stop, up, down, forward, backward, on/off. In this example an activity of the first function F1 has been selected. Therefore when there is a match with the first response pattern RP1 made up of the first, second and third response signal groups RSG1, RSG2 and RSG3, the pulse response analysing unit 30 connects to the wireless interface WI and sends an instruction to the first function handling unit 38 specifying that a user input has been made in relation to the first function F1.

In this second embodiment the pattern is furthermore updated with the response signal group $RSG_D$ that was found to match the pattern, step 74. This means that the detected response signal group $RSG_D$, which matches the pattern, is added to the response pattern. At the same time the oldest response signal group is removed from the pattern, step 76. When this has been done the pulse providing unit 26 continues to send pulses, step 62, which may also here be done repeatedly.

A match may be determined in several ways. The pulse response analysing unit may be trained, through machine learning techniques and using the several response signal groups of the pattern, whether a detected response signal group matches the pattern or not. It is also possible to determine statistical variations of the individual responses from wires of a pattern. A detected response signal group may then be considered to match a pattern if the individual responses of the detected group are within limits set by these statistical variations. It is also possible to have a majority vote in the sense that a detected response signal group may be considered to match a pattern if it is found to match a majority of the response signal groups of the pattern.

Through the pattern being updated, the arrangement is also able to automatically adapt to the slow changes of the environment. Whenever a user activity associated with a function is detected, the detected response signal group is added to the corresponding pattern. If the detector has a learning window with size K, which means the latest K samples are used for decision making, then it is possible to adapt to the gradual changes of the environment, which variations may depend on such things as humidity, heat, light, seasonal variation, aging of the paper, etc.

In case the second function is a slide show presentation function and the second function handling unit is a beamer, then the above-described touch sensitivity can be used together with the beamer to realize an interactive presentation on the wall. A projector may in the beginning show a test picture marking spots to be pressed by hand in a training interval. In this way a touch on the wallpaper and the displayed picture may be calibrated and aligned. Then in the later presentation, a controlling node, which may be the second function control unit, may receive information of the spots being touched and can react on these through performing changes in the presentation.

The arrangement does not only allow a very flexible provision of location for user inputs. It is also cost efficient.

There are many possible variations that may be made to the invention. It is possible to remove associations between patterns and functions. This means that if a user tires of a certain function or tires of a certain location being associated with a function, the association can be removed or changed. It is also possible to provide user input in relation to more than one function. It is thus possible to associate a pattern with more than one function. It is also possible that the various function handling units are able to find the user input detector and its capabilities through a discovery phase. It is furthermore possible that the user input detector is connected to one or more function handling units via wires, which is especially possible in case spots are pre-defined. Instructions were only described in relation to the second embodiment, it should be realized that they may also be used in the first embodiment. It is also possible that a pre-defined pattern is made up of several response signal groups and this pattern may also be updated with the detected response signal groups that match the pattern.

The units of the user input detector, perhaps except for the radio communication unit, may be provided in the form of a processor with associated program memory including computer program code for performing the functionality of its units. These units may also be provided in the form of a digital signal processor (DSP).

Figure 12:
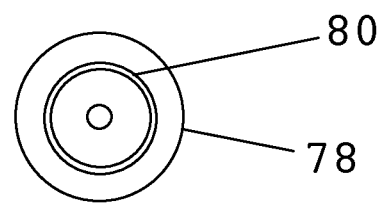

A computer program may also be a computer program product, for instance in the form of a computer readable storage medium or data carrier, like a CD ROM disc or a memory stick, carrying such a computer program with the computer program code, which will implement the functionality of the above-described user input detector when being loaded into a processor. One such computer program product in the form of a CD ROM disc 78 with the above-mentioned computer program code 80 is schematically shown in FIG. 12.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A function activity handling arrangement for provision in a building, the function activity handling arrangement comprising:

a wallpaper with a group of embedded electrical wires, said wire group comprising at least one wire;
a user input detector comprising a wire connector for connection to the wire group;
a pulse providing unit configured to send electric pulses to the wire group, wherein the electric pulses are sent by touching the wallpaper by an object;
a pulse response detecting unit configured to detect a group of response signals corresponding to the sent pulses; and
a pulse response analyzing unit configured to compare the group of response signals with a set of response patterns and to provide, if the detected response signal group matches a response pattern, user input data for a corresponding function for the corresponding response pattern in order to perform an activity.

2. The function activity handling arrangement of claim 1, wherein the user input detector further comprises a function associating unit configured to obtain, in a training interval, at least one response signal group, form a response pattern based on the received response signal group, and associate a function with the response pattern.

3. The function activity handling arrangement of claim 2, wherein the function associating unit is configured to receive several response signal groups and form a response pattern comprising said several received response signal groups.

4. The function activity handling arrangement of claim 3, wherein the function associating unit is further configured to, after the pulse response analyzing unit has found a match between a detected response signal group and a response pattern, update the response pattern with this response signal group.

5. The function activity handling arrangement of claim 4, wherein the function associating unit is further configured to remove an old response signal group when updating the response pattern.

6. The function activity handling arrangement according claim 2, further comprising a communication interface for communicating with a remote user interface via which a user may operate the function associating unit in order to associate a response pattern with the function.

7. The function activity handling arrangement of claim 1, wherein the wires in the wire group extend longitudinally between opposing edges of the wallpaper.

8. The function activity handling arrangement of claim 1, wherein the wires in the wire group are provided in a pattern with each wire being separated from every other wire.

9. A method for performing an activity of a function in a building, the method being performed in a user input detector and comprising the steps of:

sending electric pulses to electrical wires of a wire group in a wallpaper, said wire group comprising at least one wire embedded in the wallpaper, wherein the electric pulses are sent by touching the wallpaper by an object;
detecting a group of response signals corresponding to the sent electric pulses;
comparing the detected response signal group with a set of response patterns; and
in response to determining that the detected response signal group matches a response pattern, providing user input data for a function corresponding to the response pattern in order to perform the activity.

10. The method of claim 9, further comprising assigning a function to a response pattern through obtaining, in a training interval, at least one response signal group, forming a response pattern based on the response signal group, and associating a function with the response pattern.

11. The method of claim 9, wherein several response signal groups are received and the formed response pattern comprises said several received response signal groups.

12. The method of claim 11, further comprising, after finding a match between a detected response signal group and a response pattern, updating the response pattern with this response signal group.

13. The method of claim 12, further comprising removing an old response signal group when updating the response pattern.

14. The method of claim 9, further comprising communicating with a remote user interface for allowing a user to associate said response pattern with said function.

15. A non-transitory computer-readable medium comprising, stored thereupon, a computer program for performing an activity of a function in a building and comprising computer program code that, when run in a user input detector, causes the user input detector to:
   send electric pulses to electrical wires of a wire group in a wallpaper, said wire group comprising at least one wire embedded in the wallpaper, wherein the electric pulses are sent by touching the wallpaper by an object;
   detect a group of response signals corresponding to the sent electric pulses;
   compare the detected response signal group with a set of response patterns; and
   provide, if the response signal group matches a response pattern, user input data for a function corresponding to the response pattern in order to perform the activity.

* * * * *